(12) United States Patent
Hwang et al.

(10) Patent No.: US 11,717,902 B2
(45) Date of Patent: Aug. 8, 2023

(54) APPARATUS FOR DISMANTLING FOR HEAVY WATER REACTOR FACILITIES

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Sung-Hoon Hong, Daegu (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 0 days.

(21) Appl. No.: 17/423,204

(22) PCT Filed: Jan. 8, 2020

(86) PCT No.: PCT/KR2020/000339
§ 371 (c)(1),
(2) Date: Jul. 15, 2021

(87) PCT Pub. No.: WO2020/149568
PCT Pub. Date: Jul. 23, 2020

(65) Prior Publication Data
US 2022/0108810 A1    Apr. 7, 2022

(30) Foreign Application Priority Data
Jan. 18, 2019   (KR) .......................... 10-2019-0006687

(51) Int. Cl.
B23D 45/00      (2006.01)
G21D 1/00       (2006.01)
B23D 53/00      (2006.01)

(52) U.S. Cl.
CPC ......... B23D 45/003 (2013.01); B23D 53/006 (2013.01); G21D 1/003 (2013.01); *Y10T 29/531* (2015.01)

(58) Field of Classification Search
CPC .................................................... Y10T 29/531
See application file for complete search history.

(56) References Cited

U.S. PATENT DOCUMENTS 3,807,018 A * 4/1974 Ehrman ................. G21C 19/36
29/723
4,594,774 A * 6/1986 Barker .................... G21D 1/003
976/DIG. 293

(Continued)

FOREIGN PATENT DOCUMENTS

JP        08-027392      3/1996
JP      10090493 A  *  4/1998

(Continued)

OTHER PUBLICATIONS

English Machine Translation JP10090493A or JPH1090493A, Hotta Masataka, Apr. 10, 1998 (Year: 1998).*

*Primary Examiner* — Sarang Afzali
(74) *Attorney, Agent, or Firm* — Lex IP Meister, PLLC (57) ABSTRACT

An exemplary embodiment of the present invention provides an apparatus for dismantling for heavy water reactor facilities, including: a cutting device configured to divide a calandria of the heavy water reactor facilities into a main shell and a sub-shell; and a transfer device configured to draw the main shell cut by the cutting device to the outside, wherein the transfer device includes a fixing unit configured to fix the calandria; and a transfer unit configured to transfer the fixing unit.

6 Claims, 6 Drawing Sheets

(56) References Cited

U.S. PATENT DOCUMENTS

| | | | | |
|---|---|---|---|---|
| 4,714,583 A | * | 12/1987 | Wachter | G21C 19/36 |
| | | | | 376/261 |
| 5,276,965 A | * | 1/1994 | Hahn | G21F 9/28 |
| | | | | 29/426.4 |
| 6,599,067 B2 | * | 7/2003 | Scott | G21C 19/207 |
| | | | | 166/55.7 |
| 7,673,544 B2 | * | 3/2010 | Jung | G21C 19/37 |
| | | | | 83/167 |

FOREIGN PATENT DOCUMENTS

| | | |
|---|---|---|
| JP | 2857805 | 2/1999 |
| JP | 2005-291710 | 10/2005 |
| JP | 4124643 | 7/2008 |
| JP | 4158657 | 10/2008 |
| JP | 4256349 | 4/2009 |
| KR | 10-1226689 | 1/2013 |
| KR | 10-2015-0075822 | 7/2015 |

* cited by examiner

APPARATUS FOR DISMANTLING FOR HEAVY WATER REACTOR FACILITIES

TECHNICAL FIELD

The present invention relates to an apparatus and method for dismantling for heavy water reactor facilities.

BACKGROUND ART

In general, heavy water reactor facilities of nuclear facilities used for nuclear power generation include a calandria and a calandria vault for accommodating the calandria therein.

A calandria is a nuclear fuel injection cylinder of a nuclear reactor of a heavy water reactor type nuclear power plant and has a cylindrical pipe structure for injecting nuclear fuel during a normal operation of the power plant and discharging a combusted nuclear fuel bundle.

When the heavy water reactor facilities are dismantled, it is necessary to first salvage the calandria, a highly activated structure accommodated inside a calandria vault, to the outside of the calandria vault and dismantle the calandria.

DISCLOSURE

Technical Problem

The present invention has been made in an effort to provide an apparatus and method for dismantling for heavy water reactor facilities having advantages of easily salvaging a calandria accommodated inside a calandria vault to the outside and dismantling the calandria.

Technical Solution

An exemplary embodiment of the present invention provides an apparatus for dismantling for heavy water reactor facilities, including: a cutting device configured to divide a calandria of the heavy water reactor facilities into a main shell and a sub-shell; and a transfer device configured to draw the main shell cut by the cutting device to the outside, wherein the transfer device includes a fixing unit configured to fix the calandria; and a transfer unit configured to transfer the fixing unit.

The fixing unit may include a plurality of bar-shaped support portions; and a plurality of joint portions connecting the support portions to each other, and the support portions surround the calandria using the joint portions to fix the calandria.

The transfer unit may include a pair of rail portions installed at both ends of the calandria; and a rail groove formed in each of the rail portions, and the fixing unit may move along the rail portion.

The cutting device may include a cutting unit configured to move along a pressure tube through portion formed in an end shield of the calandria to cut a connection portion between the main shell and the sub-shell; and a movement adjusting unit configured to adjust movement of the cutting unit.

The cutting unit may include an end effector configured to cut the connection portion; a support portion configured to support the end effector; a cutting joint portion connected to the support portion and configured to change a direction of the end effector; and a support driving portion configured to support the support portion.

The movement adjusting unit may include a forward/backward movement adjusting portion configured to adjust a forward/backward movement of the cutting unit; and an upward/downward movement adjusting portion configured to adjust an upward/downward movement of the cutting unit.

Another exemplary embodiment of the present invention provides a method for dismantling for heavy water reactor facilities including a calandria including a main shell and a sub-shell, a calandria vault accommodating the calandria therein, a pressure tube penetrating an inside of the calandria horizontally, and a calandria tube surrounding the pressure tube, including: removing the pressure tube and the calandria tube; opening an upper portion of the calandria vault; inserting the transfer device into the calandria vault through an upper portion of the calandria vault to support the main shell of the calandria; inserting the cutting device into a pressure tube through portion of an end shield of the calandria through the upper portion of the calandria vault to cut a portion between the main shell and the sub-shell of the calandria; and drawing the main shell of the calandria to the outside of the calandria vault from an inside of the calandria vault using the transfer device.

The heavy reactor facilities may further include a reactivity mechanism deck supported by the upper portion of the calandria vault and configured to cover the calandria, and the opening of the upper portion of the calandria vault includes separating the reactivity mechanism deck from the calandria vault.

The transfer device may include a fixing unit configured to fix the calandria and a transfer unit configured to transfer the fixing unit, and the supporting of the main shell of the calandria may include inserting the fixing unit into the calandria vault in a U-shape with a lower side opened; and surrounding and supporting the main shell of the calandria with the fixing unit in an O-shape.

The cutting of the portion between the main shell and the sub-shell of the calandria may include: inserting an end effector of the cutting device into the calandria through the pressure tube through portion; positioning the end effector to be adjacent to a connection portion between the main shell and the sub-shell using a cutting joint portion of the cutting device; and cutting a connection portion between the main shell and the sub-shell of the calandria using the end effector.

Advantageous Effects

According to an exemplary embodiment, the calandria accommodated inside the calandria vault may be easily salvaged externally and dismantled.

In addition, the calandria may be dismantled safely and quickly without worker exposure by remote control using the method of dismantling for heavy water reactor facilities.

MODE FOR INVENTION

Hereinafter, various exemplary embodiments of the present invention will be described in detail with reference to the accompanying drawings so that those skilled in the art may easily carry out the present invention The present invention may be embodied in many different forms and is not limited to the exemplary embodiments described herein.

In order to clarify the present invention, parts irrespective of description will be omitted, and similar reference numerals are used for the similar parts throughout the specification.

The size and thickness of each element are arbitrarily illustrated in the drawings, and the present invention is not necessarily limited thereto.

Figure 1:
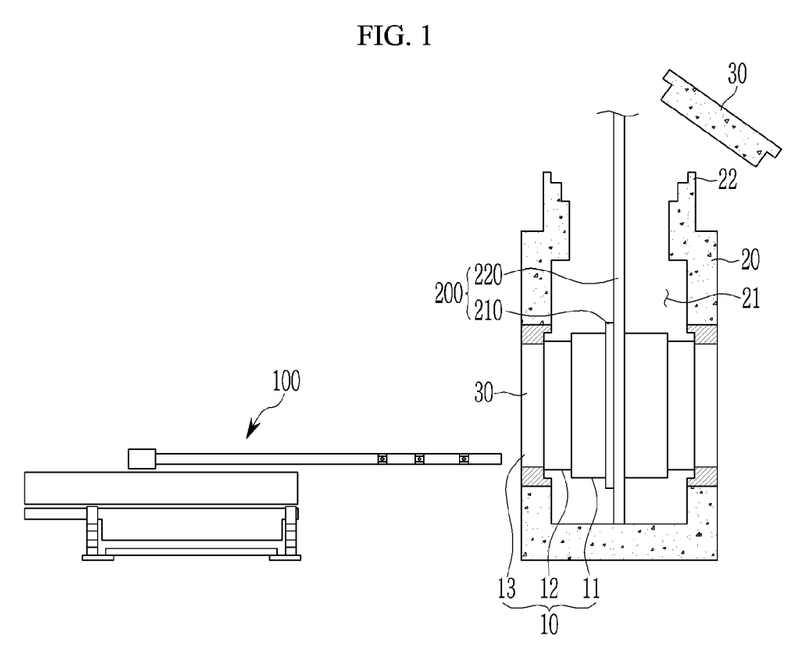
FIG. 1 is a view showing a state in which an apparatus for dismantling for heavy water reactor facilities according to an exemplary embodiment is installed in a heavy water reactor.

FIG. 1 is a view showing a state in which an apparatus for dismantling for heavy water reactor facilities according to an exemplary embodiment is installed in a heavy water reactor.

Hereinafter, CANDU type heavy water reactor facilities including calandria as heavy water reactor facilities will be described as an example, but the heavy water reactor facilities are not limited thereto.

The heavy water reactor facilities include the calandria 10 including a main shell 11 located in the center, a sub-shell 12 connected to both ends of the main shell 11, and an end shield 13 connected to the sub-shell 12, a calandria vault 20 supporting the end shield 13 of the calandria 10 to accommodate the calandria 10 inside 21 thereof, and a reactivity mechanism deck 30 located at an upper portion 22 of the calandria vault 20 and covering the calandria 10.

Meanwhile, in the heavy water reactor facilities, a known internal structure such as a guide pipe and a poison injection pipe located inside the calandria 10, pipes such as a known pressure tube and calandria tube connected to the calandria 10, and the like are in a state of being separated from the calandria 10, and control devices such as known control rods and absorption rods connected to the calandria 10 connected to the calandria 10 through the reactivity device deck 30 are in a state of being separated from the calandria 10. Also, a known upper guide tube and side guide tubes connected to the calandria 10 are in a state of being separated from the calandria 10.

As shown in FIG. 1, the apparatus for dismantling for heavy water reactor facilities according to an exemplary embodiment includes a cutting device 100 and a transfer device 200.

The cutting device 100 may separate the calandria 10 of the heavy water reactor into the main shell 11 and a sub-shell 12. The transfer device 200 may draw the main shell 11 cut by the cutting device 100 to the outside.

Figure 2:
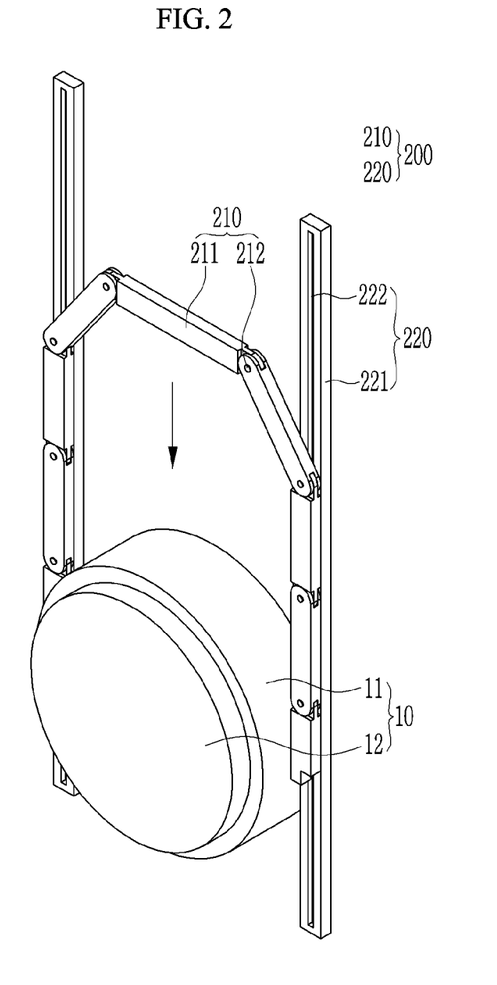
FIGS. 2 and 3 are perspective views illustrating a use state of a transfer device of an apparatus for dismantling for heavy water reactor facilities according to an exemplary embodiment.
Figure 3:
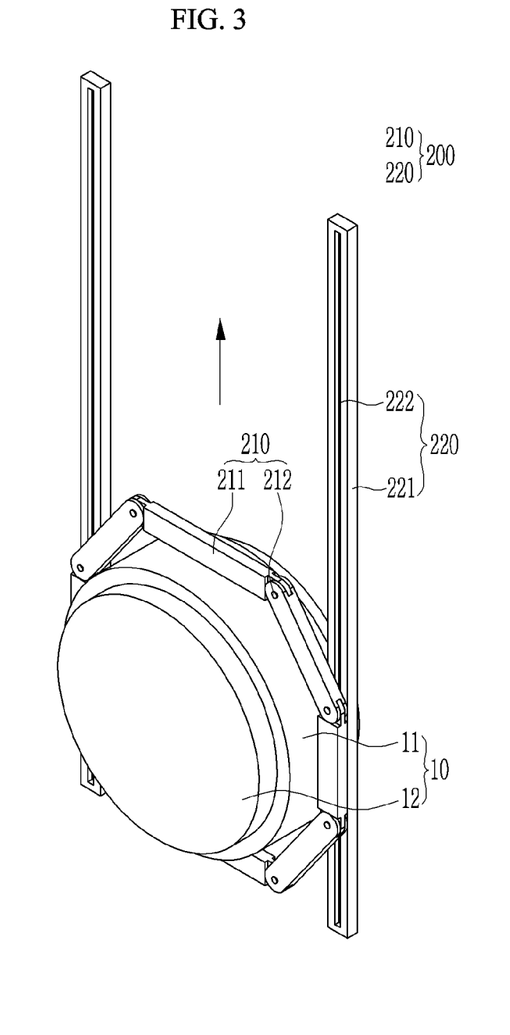

FIGS. 2 and 3 are perspective views illustrating a use state of a transfer device of an apparatus for dismantling for heavy water reactor facilities according to an exemplary embodiment.

The transfer device 200 may include a fixing unit 210 for fixing the calandria 10, and a transport unit 220 for transporting the fixing unit 210.

The fixing unit 210 may have a plurality of rod-shaped support portions 211 and a plurality of joint portions 212 connecting the support portions 211 to each other. The joint portion 212 may include, but is not limited to, articulated arms.

The transfer unit 220 may include a pair of rail portions 221 installed at both ends of the calandria 10, and rail grooves 222 formed in the rail portions 221. The fixing unit 210 may move along the rail portions 221.

Using the joint portion 212, the support portion 211 may surround and support the calandria 10. That is, the fixing unit 210 may be selectively formed in a reverse U-shape or O-shape to support the main shell 11 of the calandria 10.

As shown in FIG. 2, the fixing unit 210 may be formed in an reverse U-shape with an open lower side and moved along the rail groove 222 formed in the rail portion 221. Also, as shown in FIG. 3, the fixing unit 210 may be formed in an O-shape to surround and support the main shell 11 of the calandria 10.

Figure 4:
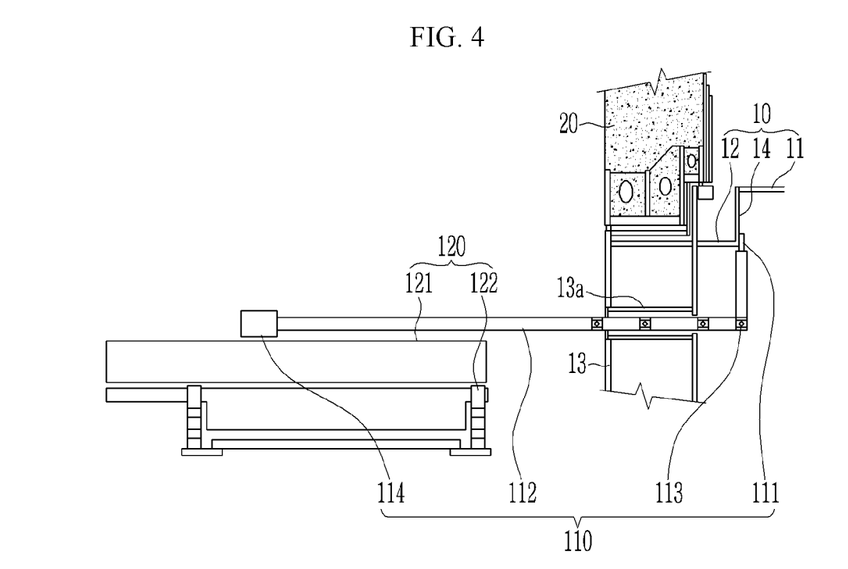
FIG. 4 is a view showing a use state of a cutting device of an apparatus for dismantling for heavy water reactor facilities according to an exemplary embodiment.

FIG. 4 is a view showing a use state of a cutting device of an apparatus for dismantling for heavy water reactor facilities according to an exemplary embodiment.

As shown in FIG. 4, the cutting device 100 may include a cutting unit 110 for cutting a connection portion 14 between the main shell 11 and the sub-shell 12, and a movement adjusting unit 120 adjusting movement of the cutting unit 110.

The cutting unit 110 may move along a pressure tube through portion 13a of the end shield 13 of the calandria 10 to cut the connection portion 14 between the main shell 11 and the sub-shell 12.

The cutting unit 110 may include an end effector 111 cutting the connection portion 14, a support portion 112 supporting the end effector 111, a cutting joint portion 113 connected to the support portion 112 and changing a direction of the end effector 111, and a support driving unit 114 driving the support portion 112.

The end effector 111 may include a cutting element including an oscillator irradiating a laser beam, but is not limited thereto and may include a cutting element such as a rotary saw.

The cutting joint portion 113 may include, but is not limited to, articulated arms.

The movement adjusting unit 120 may include a forward/backward movement adjusting portion 121 for adjusting a forward and backward movement of the cutting unit 110 and an upward/downward movement adjusting portion 122 for adjusting an upward/downward movement of the cutting unit 110.

Hereinafter, a dismantling method using an apparatus for dismantling for heavy water reactor facilities according to an exemplary embodiment of the present invention will be described in detail with reference to the drawings.

Figure 5:
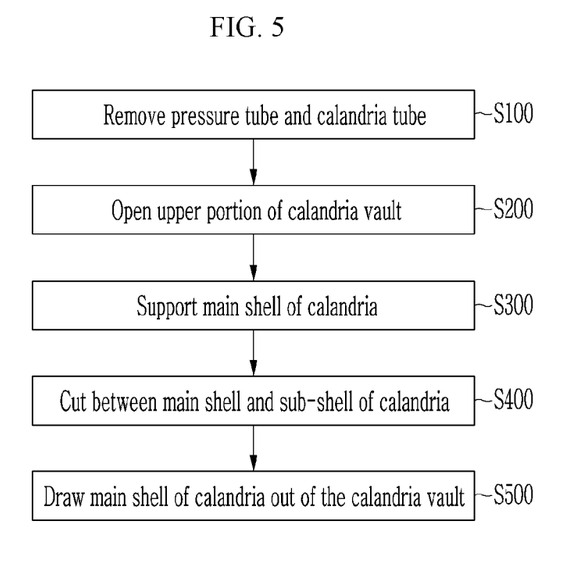
FIG. 5 is a flowchart of a method for dismantling of heavy water reactor facilities according to an exemplary embodiment.
Figure 6:
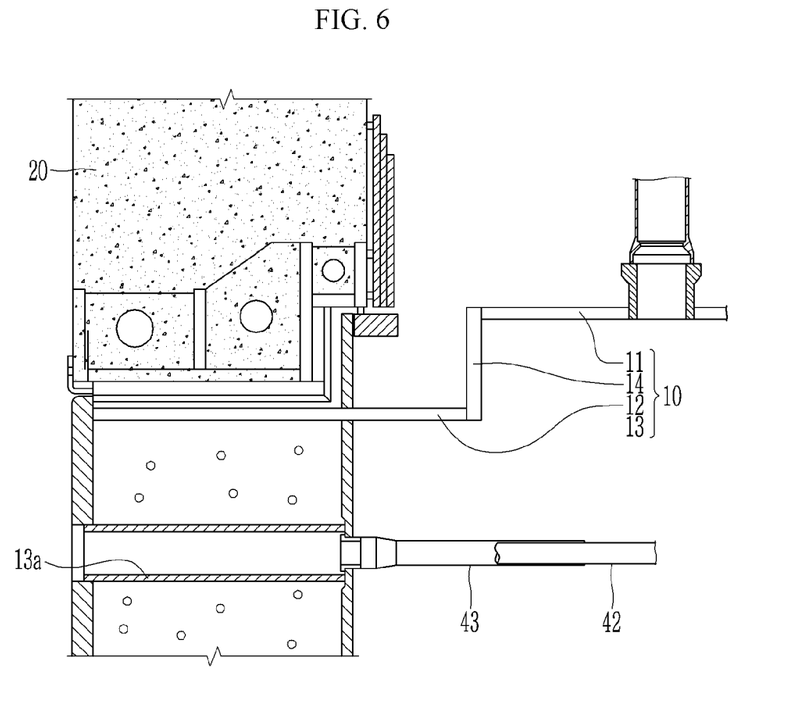
FIG. 6 is a schematic cross-sectional view of heavy water reactor facilities according to an exemplary embodiment.

FIG. 5 is a flowchart of a method for dismantling of heavy water reactor facilities according to an exemplary embodiment, and FIG. 6 is a schematic cross-sectional view of heavy water reactor facilities according to an exemplary embodiment.

As shown in FIGS. 5 and 6, first, a pressure tube 42 and a calandria tube 43 located inside the calandria 10 are removed to the outside of the calandria 10 (S100). Since the pressure tube 42 and the calandria tube 43 are highly irradiated structures, a risk of a dismantling operation may be reduced by removing the pressure tube 42 and the calandria tube 43 first. Here, the internal structures such as the guide tube and the poison injection tube located inside the calandria 10 are also removed. In addition, the upper guide tube and the side guide tube connected to an outer wall of the calandria, and the control rod and the absorption rod inserted in the calandria through the tubes are also removed from the calandria 10.

Next, as shown in FIGS. 1 and 5, the upper portion 22 of the calandria vault 20 is opened (S200).

In order to open the upper portion 22 of the calandria vault 20, the reactivity mechanism deck 30 is separated from the calandria vault 20. Then, the upper portion 22 of the calandria vault 20 is expanded. An opening area of the upper portion 22 of the calandria vault 20 from which the reactivity mechanism deck 30 was separated may be expanded using a cutting element such as a wire saw. By expanding the upper portion 22 of the calandria vault 20, the transfer device 200 may be easily inserted into the inside 21 of the calandria vault 20, and the calandria 10 may be easily drawn out of the inside 21 of the calandria vault 20.

Next, as shown in FIGS. 2, 3 and 5, the main shell 11 of the calandria 10 is supported (S300).

Specifically, the main shell 11 of the calandria 10 is supported by inserting the transfer device 200 into the inside 21 of the calandria vault 20 through the expanded upper portion 22 of the calandria vault 20.

The fixing unit 210 and the transfer unit 220 are inserted into the calandria vault 20, and the fixing unit 210 is moved along the transfer unit 220.

The fixing unit 210 may support the main shell 11 of the calandria 10 by selectively forming a reverse U-shape or an O-shape using the joint portion 212.

That is, as shown in FIG. 2, the fixing unit 210 is formed in a reverse U-shape with the lower side open and is inserted to the inside 21 of the calandria vault 20 along the rail groove 222 formed in the rail portion 221. Also, as shown in FIG. 3, the fixing unit 210 is formed in an O-shape to surround and support the main shell 11 of the calandria 10.

Next, as shown in FIGS. 4 and 5, a portion between the main shell 11 and the sub-shell 12 of the calandria 10 is cut (S400).

Specifically, the end effector 111 of the cutting unit 110 is inserted into the calandria 10 through the pressure tube through portion 13a of the end shield 13.

In addition, the end effector 111 may be positioned adjacent to the connection portion 14 between the main shell 11 and the sub-shell 12 using the cutting joint portion 113 of the cutting unit 110.

In addition, the connection portion 14 between the main shell 11 and the sub-shell 12 of the calandria 10 may be cut using the end effector 111.

Next, as shown in FIG. 5, the main shell 11 of the calandria 10 is drawn out of the calandria vault 20 (S500).

Specifically, the main shell 11 of the calandria 10 cut from the sub-shell 12 supported in the calandria vault 20 is drawn out of the calandria vault 20 by moving the transfer device 200 from the inside 21 of the calandria vault 20 to the outside through the upper portion 22.

For the withdrawal of the main shell 11 of the calandria 10, the fixing unit 210 forming an O-shape inside 21 of the calandria vault 20 to support the main shell 11 of the calandria 10 is moved from the inside 21 of the calandria vault 20 along the rail portion 221 through the upper portion 22.

Next, the main shell 11 of the calandria vault 20 drawn out of the calandria vault 20 may be cut and dismantled.

As described above, in the method for dismantling for heavy water reactor facilities according to an exemplary embodiment, the calandria 10, which is a highly activated structure accommodated in the calandria vault 20, may be first easily salvaged and dismantled to the outside of the calandria vault 20 using the cutting device 100 and the transfer device 200 when the heavy water reactor facilities are dismantled.

Although the present disclosure has been described through exemplary embodiments as described above, the present invention is not limited thereto, and various modifications and variations may be made as understood by those skilled in the art to which the present invention pertains without departing from the scope of the present invention described in claims below.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the scope of the appended claims.

The invention claimed is:

1. An apparatus for dismantling for heavy water reactor facilities, the apparatus comprising:
a cutting device configured to divide a calandria of the heavy water reactor facilities into a main shell and a sub-shell; and
a transfer device configured to draw the main shell cut by the cutting device to an outside, wherein:
the transfer device includes:
a fixing unit configured to hold the calandria; and
a transfer unit configured to transfer the fixing unit,
wherein the fixing unit includes a plurality of support portions including a first support portion and a second support portion facing the first support portion, the first support portion and the second support portion configured to hold the calandria,
wherein the transfer unit includes a first rail portion coupled to the first support portion and a second rail portion coupled to the second support portion,
wherein the first rail portion and the second rail portion are disposed on different axes and configured to be installed at both ends of the calandria, and
wherein the first support portion moves along the first rail portion, and the second support portion moves along the second rail portion.

2. The apparatus of claim 1, wherein:
the fixing unit includes:
a plurality of joint portions connecting the plurality of support portions to each other, and
the plurality of support portions configured to surround the calandria using the joint portions to hold the calandria.

3. The apparatus of claim 2, wherein:
the transfer unit includes
a rail groove formed in each of the first rail portion and the second rail portion.

4. The apparatus of claim 1, wherein:
the cutting device includes:
a cutting unit configured to move along a pressure tube through portion formed in an end shield of the calandria to cut a connection portion between the main shell and the sub-shell; and
a movement adjusting unit configured to adjust movement of the cutting unit.

5. The apparatus of claim 4, wherein:
the cutting unit includes:
an end effector configured to cut the connection portion;
an end effector support portion configured to support the end effector;

a cutting joint portion connected to the end effector support portion and configured to change a direction of the end effector; and
a support driving portion configured to support the end effector support portion.

6. The apparatus of claim 4, wherein:
the movement adjusting unit includes
a forward/backward movement adjusting portion configured to adjust a forward/backward movement of the cutting unit; and
an upward/downward movement adjusting portion configured to adjust an upward/downward movement of the cutting unit.

\* \* \* \* \*